Sept. 1, 1959　　　　　C. L. SINGLETON　　　　　2,902,541
CREDIT VERIFYING SYSTEM

Filed Oct. 19, 1956　　　　　　　　　　　　　　5 Sheets-Sheet 1

INVENTOR:
CHARLES L. SINGLETON

BY Homer P. Montague
ATTORNEY

Sept. 1, 1959   C. L. SINGLETON   2,902,541
CREDIT VERIFYING SYSTEM
Filed Oct. 19, 1956   5 Sheets-Sheet 2

INVENTOR:
CHARLES L. SINGLETON,

BY Homer P. Montague
ATTORNEY

Sept. 1, 1959  C. L. SINGLETON  2,902,541
CREDIT VERIFYING SYSTEM
Filed Oct. 19, 1956  5 Sheets-Sheet 3

INVENTOR:
CHARLES L. SINGLETON,

BY Homer R. Montague
ATTORNEY

Sept. 1, 1959

C. L. SINGLETON 2,902,541

CREDIT VERIFYING SYSTEM

Filed Oct. 19, 1956

INVENTOR:
CHARLES L. SINGLETON,

BY Homer P. Montague
ATTORNEY

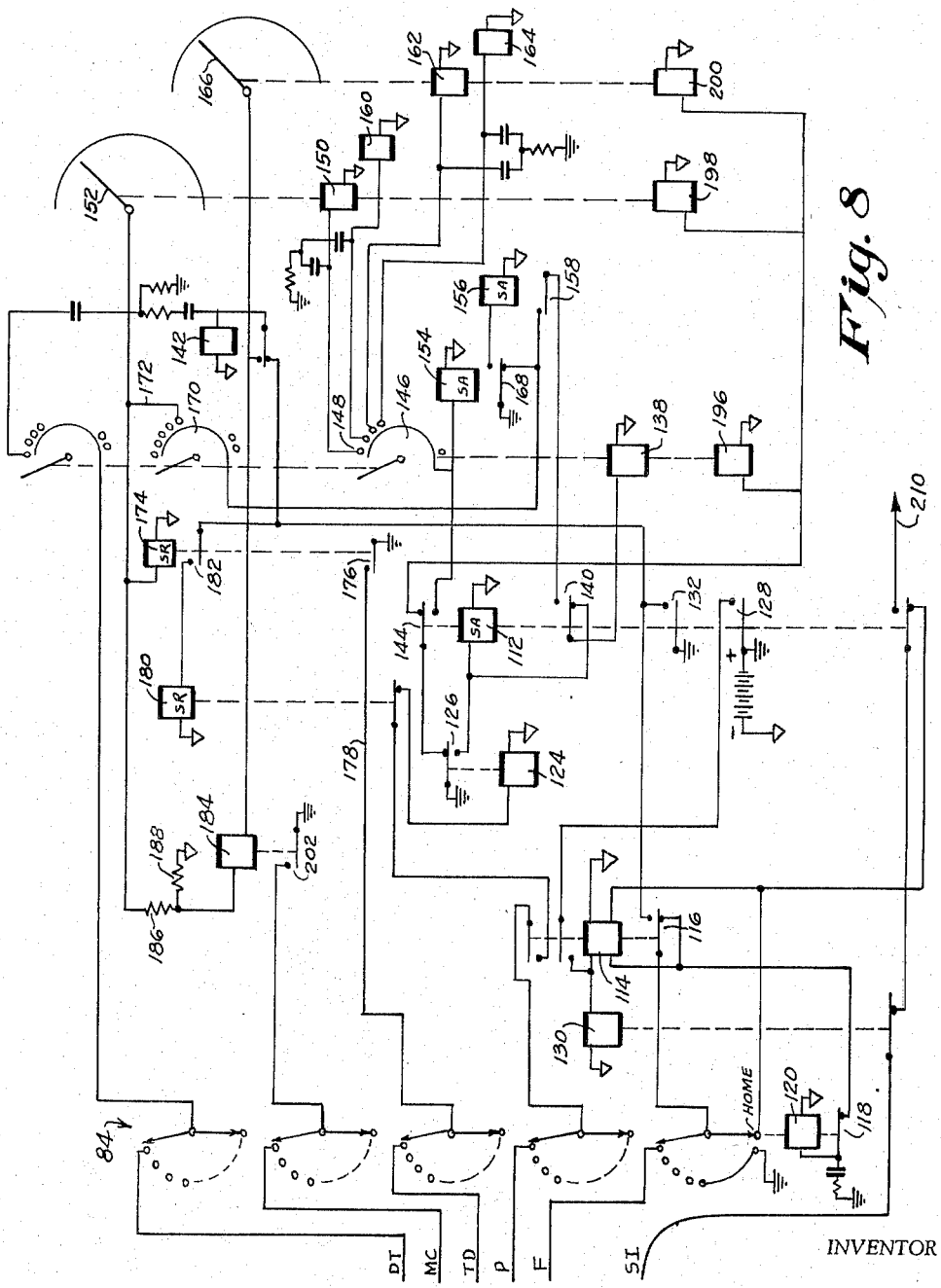

United States Patent Office 2,902,541
Patented Sept. 1, 1959

2,902,541

CREDIT VERIFYING SYSTEM

Charles L. Singleton, Kansas City, Mo., assignor, by direct and mesne assignments, to Multocator Corporation, Omaha, Nebr., a corporation of Missouri Application October 19, 1956, Serial No. 617,130

6 Claims. (Cl. 179—2)

This invention pertains to credit verifying equipment and systems, and more specifically to systems for performing rapidly and automatically the operations associated with advising a salesperson or other worker as to the credit status of a customer. Certain aspects of the invention are of more general application, especially where it is desired to store permanent but readily changeable information in the form of binary figures as to a large number of possible questions or inputs.

In the interest of a clear and concrete understanding of the novel aspects of the invention, it will be described herein in connection with the specific problem of credit checking, as in a large department store or other mercantile enterprise, but it will be understood that this example is given for purposes of illustration, and that the invention itself can readily be used, with little or even no change, to simplify similar operations wherever fast access is required to a large amount of information which can be put into the form of alternate choices.

It is common practice in large mercantile operations to provide a more or less centralized credit department in which are kept the account records of all credit customers. Conventionally, these records are maintained by clerks, and, when necessary, inspected by them or other clerks in answer to telephone queries received from sales persons whenever a customer desires credit in connection with a transaction of greater than a specified minimum amount. Since every such credit transaction requires the inspection of the customer's credit record or current account by the credit clerk, a great deal of manual work is involved in answering the telephone, finding the customer's record, and reporting the account status. Particularly in the larger stores, the number of credit customers and transactions may require that the credit department files and operating space occupy many thousands of square feet involving heavy overhead expense, and the time consumed by the clerks in obtaining the desired records, not all of which can be closely adjacent the telephones employed. Moreover, during this not only is the credit clerk occupied, but the salesperson and the customer are also kept waiting.

It is a fact well established by business experience that in operations of this sort, by far the major portion of the accounts checked will be found to be in order so far as the further extension of credit is concerned. The present invention takes advantage of this fact by completely eliminating manual operations in the credit department as to any query in which the customer's credit is to be approved. Thus, while the system will operate perfectly even if it should happen that many or all of the accounts are in bad or at least in a restricted credit status, the time and labor saved by the invention will increase with the proportion of "good" accounts. Moreover, the statistical predominance of "good" accounts permits a design to be employed which greatly reduces the cost of the equipment needed, and which has collateral advantages to be pointed out below.

Briefly, the invention provides at or near the credit records of such an enterprise, a long-term but readily changeable memory or storage device which provides means for recording whether each of the accounts is individually "good" or "bad," in the sense of whether they require an answer other than mere approval by the credit department. In this sense, an account will be considered "good" unless the account is in arrears or excessive, or the store wishes to impose upon the customer a different payment arrangement. The invention further provides an automatic system, utilizing the machine switching techniques of the dial telephone art, to provide almost instantaneous access to this memory by the salesperson himself, without the intervention of the credit clerk. If the particular account being investigated is "good," the equipment controlled by the memory will indicate verbally to the salesperson, usually by a particular affirmative signal including a code word or number. Such a code designation can be required to be marked by the salesperson upon the order or purchase voucher, in order to establish a record of the fact that the account was in fact verified. If the account is "bad," the equipment controlled by the memory will establish a telephonic connection with a credit clerk so that only for a "bad" account will the salesperson be required to make the necessary query and await a report. Where a very large number of accounts is involved, the system contemplates that a bad indication at the memory device will connect the telephone line held by the salesperson to further selecting equipment which will enable him to dial a code representative of a subdivision of the accounts, for example the first two or three letters of the customer's surname, so that the equipment will connect him with a particular credit clerk having jurisdiction of that subdivision of the accounts. From the standpoint of complete mechanization it would be possible to store the originally dialed customer's number for this routing purpose, but the amount of equipment involved, as well as the fact that such routing will be needed only in a minor percentage of the cases, makes the system of the present invention preferable as a practical matter.

The system of the invention is designed for integration with the usual and existing internal automatic telephone exchange equipment serving the store and any outlying branches, without however requiring significant modification of such telephone equipment. This design, and the nature of the memory employed, enables the system to be installed at minimum cost, so that the net cost of the installation is kept desirably low. Moreover, the operations of keeping the stored information in the memory up-to-date, as customers make purchases or pay their bills, are simplified so that they can be performed by ordinarily trained credit personnel without the services of technical employees.

It is accordingly a major object of the invention to provide a system and equipment of the type described in which readily available automatic or digital switches are employed to provide access to a memory in the form of a matrix board or panel in which the existence of the chosen condition (herein specifically the condition of the account of a customer identified with a given point of the matrix) is signalled by the presence or absence of a plug type of unilaterally conductive electrical element, preferably a crystal diode, serving when present to establish a connection between a given horizontal conductor and a given vertical conductor of those constituting the matrix conductors. A further object of the invention is to provide auxiliary equipment which, when the particular matrix point has been plugged to mark a "bad" account, for example, will establish a telephone connection to the credit clerk, or to a selected one of several credit clerks; this auxiliary equipment, if the selected matrix point has not been plugged, will operate to connect to the calling line a pre-recorded verbal signal indicating clearance or approval of the account.

Another object of the invention is to provide a system of the above type in which the marking or plugging of the matrix board can be accomplished readily by untrained personnel, and in which no marking or plugging at all will be required in the case of accounts which never reach a questionable state. Moreover, it is the object of the invention to provide very simple means for making an operational check as to the correctness with which a plug has been inserted in a particular matrix point, including a test as to the diode element to which the plug is connected. The plug feature of the matrix memory makes it unnecessary to provide a potential marking element for all of the matrix points, because no more of the plugs are needed than the maximum number of accounts which will simultaneously be in a "bad" state. The advantage of such an arrangement over matrix devices in which each point must be served continuously by a marking device, are obvious. In addition, the physical presence of a plug at all points corresponding to "bad" accounts provides a visual indication not obtainable with more involved electronic or other memory systems.

With the above introduction in mind, the invention will now be described in connection with the selected example of a large credit department, reference being made to the accompanying drawings, in which:

Fig. 8 is a similar view of the matrix control wiring and the connections between the typical trunk circuit of Fig. 7 and the matrix itself.

The preferred embodiment of the invention herein will now be described in detail in connection with the above figures, but it will be understood that the specific details thereof can be widely varied without departing from the scope of the invention itself, which scope will be defined in the appended claims.

*General outline of equipment*

As has been indicated, the system of the invention is especially intended for operation in connection with a standard or existing private automatic telephone exchange, the conductors thereof being employed to connect any salesperson with the credit department installation for interrogation of the matrix, as well as for conveying the necessary signal back to the salesperson, or alternatively establishing a ringing and talking connection with a supervisor or credit clerk in the credit department. The details of such private automatic exchanges are familiar to those skilled in such subjects, and hence are not repeated herein. However, so far as concerns the conductors and equipment outside the credit department, it will be obvious that a manually switched exchange could equally well be employed, the automatic interrogation of the matrix being accomplished after the outlying salesperson has been connected to the control equipment by a manual operator.

Figure 1:
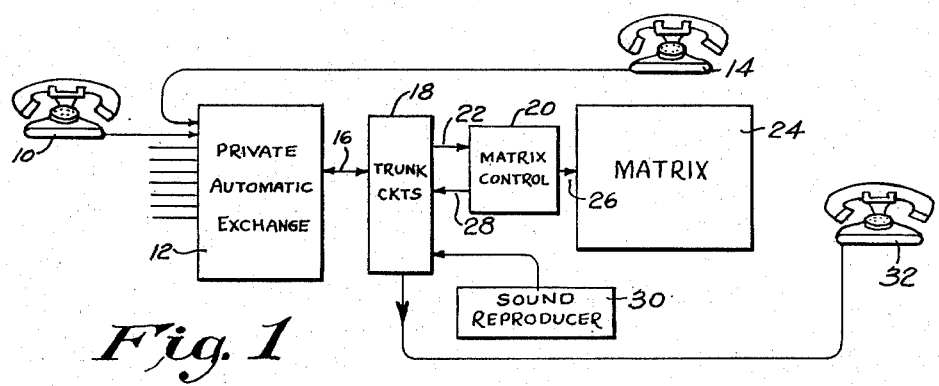
Fig. 1 is a simplified block diagram of the complete system of the invention.

Referring first to Fig. 1 of the drawings, numeral 10 designates a typical telephone substation being one of many forming the private exchange facilities of a store or like enterprise, including any outlying branches. Only one instrument 10 is shown, but the existence of a plurality of these is indicated by the several lines entering the box 12, which represents the usual or standard exchange equipment of such a telephone system. One additional instrument 14 is shown as having access to the exchange equipment in the usual way, the same as for lines typified by instrument 10, this telephone 14 being located in the credit department for use in verifying the correctness of the information stored in the matrix memory itself.

From the exchange equipment 12, one or preferably several trunks are connected as indicated at 16 to the special trunk circuit equipment 18 associated with the memory matrix. Preferably, the trunk circuit equipment will include sufficient trunk circuits to permit the matrix to be interrogated in rapid succession by different telephones of the system, and such a system is that one which will be described in more detail below. This is permissible because, as will be seen, the interrogating and responding functions of the matrix and its controls are accomplished very rapidly, and by proper design of the installation these functions can be repeated while a previous call is being answered either by an "OK" signal or by a connection to a supervisory telephone in the credit department.

The trunk circuit equipment 18 in turn extends a connection from the trunk circuit 16 to the matrix control equipment 20 to be detailed below, as over conductors symbolized at 22, and the condition of a particular matrix point is sensed. That is, the matrix control equipment 20 establishes a circuit whose two conductors extend to a particular vertical conductor and a particular horizontal conductor of the sets forming the matrix 24, the two conductors being indicated in Fig. 1 as a testing circut 26. If the particular matrix conductors are connected by a plug connector, or are not so connected, this condition will be reflected by the testing circuit 26 and the matrix control equipment 20 will then signal (as over a control conductor or conductors symbolized by 28) to the trunk equipment 18 to apply an "OK" signal from sound reproducer 30 to the calling line, or it will extend the calling line to a supervisory telephone 32 in the credit department, or in an appropriate section thereof.

*Physical arrangement of equipment*

Figure 2:
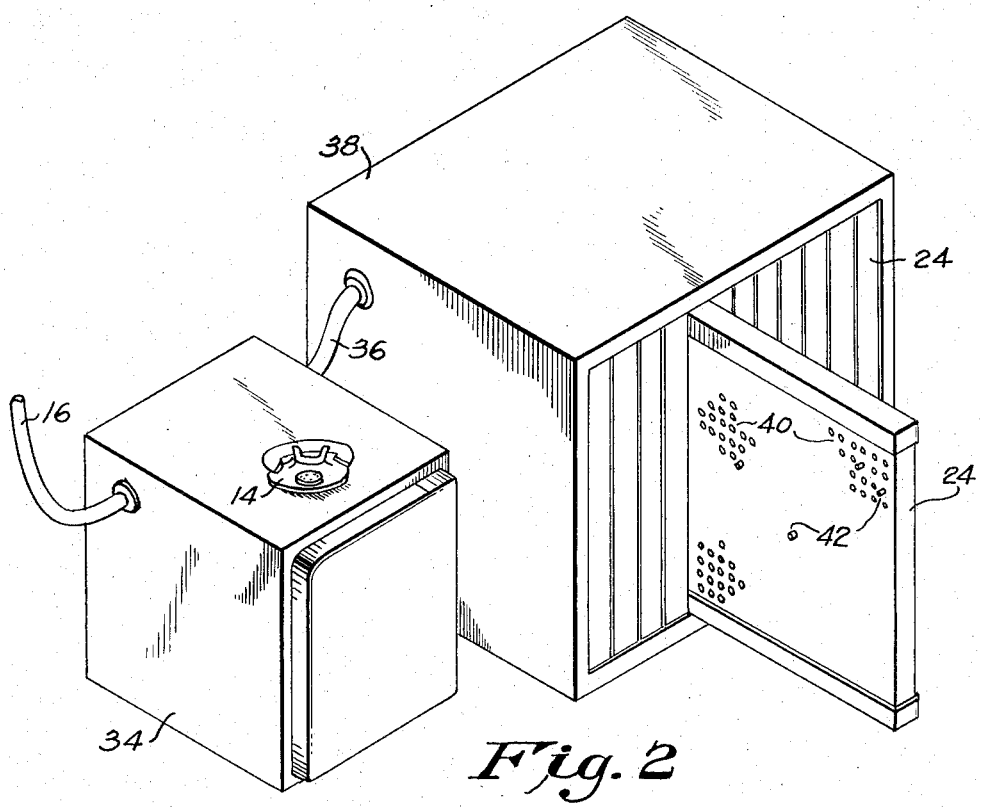
Fig. 2 is a perspective view of the physical form of the matrix board assembly and its control equipment, as installed in or near the credit department.

Before proceeding to a detailed explanation of the parts of the entire equipment, reference is made to Fig. 2 illustrating a typical and convenient form which the apparatus may assume. In this figure, numeral 16 is again used to indicate a group of matrix trunks entering the credit department from the private telephone exchange; these are shown entering a cabinet 34 preferably located in the credit department near the matrix board or boards, this cabinet containing the trunk circuit equipments, the matrix control equipment 20, and the magnetic tape or other sound reproducer which is to give the automatic clearance or "OK" signal to the calling party when required. However, the listed components may equally well be housed in separate cabinets if desired. From cabinet 34 a cable 36 extends to a second cabinet 38 which actually houses the matrix boards themselves. As shown, the credit department matrix-verifying telephone 14 is located near the matrix board cabinet, so that when a marking plug connector is placed or removed, the correct condition of the appropriate cross point can be checked immediately.

It has been found that for manual marking of the cross points of the matrix, an array of 10,000 cross points provides a convenient number per board. With the special construction to be described below, such an array of 100 horizontal and 100 vertical conductors can readily be accommodated in a matrix board four feet square or less, which provides a cross point spacing suited to manual placement and removal of the plugs, and facilitates maintenance and inspection. In an enterprise whose size justifies more than 10,000 cross points, there being one cross point for each active account, it is preferable to break the matrix assembly up into a number of such individual boards, rather than to increase the number of conductors per board, or to reduce the spacing of the cross points very much. Since access to a particular board is normally required only when the status of an account is to be changed, it is preferable to store the boards in an assembly such that any desired board can be reached on occasion.

As illustrated in Fig. 2, cabinet 38 houses a plurality of the matrix boards 24, one being shown in extended position for a change in a plug connection, or for inspection. The other boards are shown retracted within the cabinet, and all the boards would normally be so retracted for protection thereof against dust or damage. Each board is suitably mounted in the cabinet 38 as upon roller slides or the like, for easy movement to the outer position, and the conductor cables leading to the individual horizontal and vertical conductors of each matrix are of length sufficient to permit this movement. In this way, a maximum number of boards, and hence of cross points, can be accommodated in a minimum volume consistent with the necessary access to the boards. Other configurations can of course be employed, but that illustrated is preferred for the reasons given.

As generally indicated on the board 24 extending out of the cabinet 38, each board provides an array of jack openings 40, being for example holes drilled in a square array in a panel, and marking plug connectors such as those indicated at 42 are inserted in certain of the jack holes to mark the corresponding cross points. Each column and row of holes may be numbered if desired, for visual inspection and as a guide in inserting and removing the desired plug connectors, and alternatively movable horizontal and vertical indicating bars may be provided, also marked to enable a particular cross point hole or jack to be located. Such an indicating bar system will be illustrated in connection with the further description of the matrix board itself.

*Matrix board construction*

While as a theoretical proposition the use of square or other orderly arrays of marking points is very efficient in its utilization of space, certain problems arise because of the very large number of such marking points in systems of great size. Since fundamentally the parts defining one marking point are the only parts which must be duplicated for every account or entry position of the matrix, it is desirable to reduce the cost per point as much as possible. Hence, even the use of a conventional and low-cost radio type jack between the conductors at each cross point becomes expensive when 10,000 such elements are involved per board, and of course the assembly labor is correspondingly great. The present invention includes a design of the matrix boards which permits the lowest possible cost per cross point consistent with the objects to be attained. Briefly, this design utilizes the horizontal and vertical conductors themselves as the jack elements, so that no additional parts whatever are required to define a cross point. In this way, cost and labor are greatly reduced, while the desirable wiping type of spring connection is retained to preserve the self-cleaning and plug-retaining features of ordinary individual jacks of the radio or telephone types.

Figure 3:
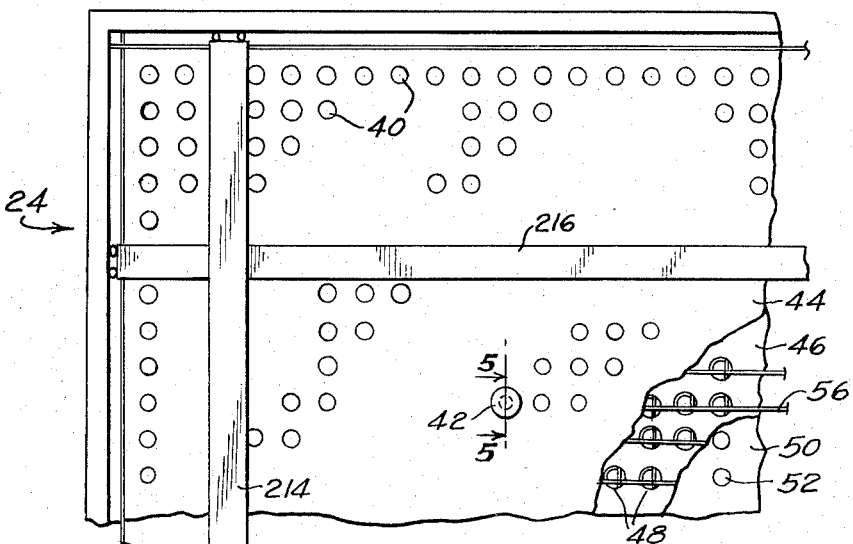
Fig. 3 is an enlarged view in front elevation of one corner of one of the matrix panels of Fig. 2, showing its construction in more detail.

Referring now to Fig. 3 of the drawings, one corner of a typical matrix board according to the invention is shown, and to give an idea of the scale of the drawing, it can be stated that it conforms approximately to a cross point spacing of 7/16 of an inch for a board providing 10,000 points and which is approximately 4 feet square, for an actual installation. The board as a whole is again designated by numeral 24 as heretofore, and it comprises an insulating front panel 44 perforated with the desired array of 100 by 100 jack holes 40, each of a size to accommodate the shank of a plug connector to be described below. Directly behind the front panel 44 lies the intermediate insulating panel 46, which is perforated by 10,000 holes 48, somewhat larger than holes 40, and to the rear panel 46 lies the insulating rear panel 50, which again may be perforated with 10,000 holes 52 of the same size as holes 40 (depending upon the plug design).

The three panels are assembled and secured in contacting arrangement, with the centers of corresponding holes in alignment. As better shown to larger scale in Fig. 4, which shows the intermediate panel 46 with the front panel removed for clarity, the front surface of panel 46 is slotted or grooved horizontally as at 54 at every height necessary to provide such a slot intersecting each of the large holes 48, and the slots are displaced somewhat to one side (as shown, the lower side) of the horizontal center-line of the holes forming one horizontal row. In each of these horizontal grooves lies an elongated, slightly tensioned coil spring 56 extending practically the entire horizontal width of the board, with its ends secured fixedly to maintain the spring in slight tension. Thus, when a suitable round-ended plug is inserted in a hole, the portion of the spring conductor 56 lying within the hole 48 is deflected downwardly thereby, without however affecting the straightness of the remainder of the spring. The shank of the plug is thus put in firm and wiping electrical contact with the spring 56, which constitutes both the horizontal conductor for one row of the matrix, and the jack element for one terminal of the plug. Electrical connection to the spring conductor 56 can be made as at a binding post 58 at either end thereof. These posts, and the securing means for the opposite end of each spring 56, will preferably be fastened to the marginal portion of panel 46 so that the springs will stay in assembled condition if the front (or rear) panel is removed for servicing.

Figure 4:
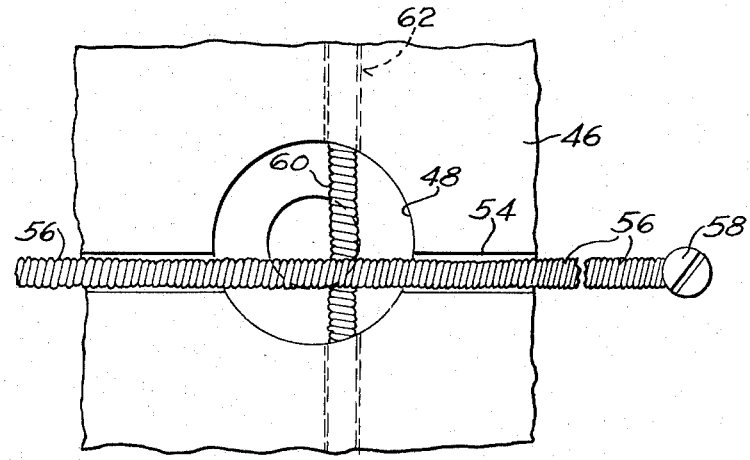
Fig. 4 is a further elevational view of part of the matrix with the front cover panel entirely removed, and further enlarged to show the arrangement of the column and row conductor springs.

To form the vertical conductors of the matrix, a set of vertical coil springs 60 are installed as indicated in Figs. 3 and 4 in grooves 62 formed on the rear surface of the intermediate panel 46, and secured in the same way along upper and lower margins of that panel, again with provision for external electrical connection to each spring. The grooves for the vertical springs 60 are also displaced from the vertical centerline of the holes forming each vertical column, as shown here, to the right, and the entering plug will thus deflect the spring laterally, and its tip portion will arrive in firm wiping engagement therewith, without disturbing contacts already made to that spring in other holes of the same column. Since the springs are dimensioned to fit nicely within the grooves, they are easily retained in assembled condition in panel 46 by the covering front and rear panels 44 and 50.

In a typical installation for a board of the dimensions already mentioned, the springs 56 and 60 may be formed by closely winding 0.010 inch diameter stainless (steel) wire tightly on a mandrel having a diameter of 0.024 inch, to give a final coil diameter of about 0.044 inch. The coil is of course wound with a certain degree of pretension, in a well-known manner, so that the successive turns of the finished spring touch one another when the coil is relaxed. Thus, several contact points for each terminal of the inserted plug are available.

Figure 5:
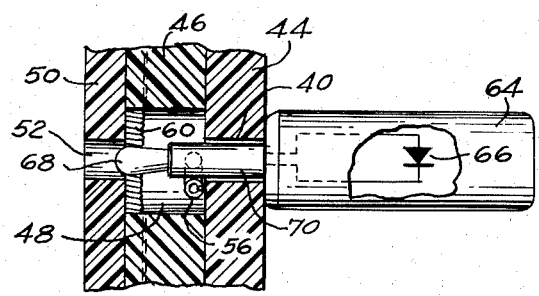
Fig. 5 is a schematic cross-sectional view through a single jack location of the whole matrix, with a marking plug connector in place, taken substantially on the line 5—5 of Fig. 3.

Fig. 5 of the drawings shows in vertical section one of the cross points with a plug 42 inserted. The plug itself is of a standard miniature radio type, having the handle portion 64 forming a shell within which the diode 66 is indicated schematically. The diode is connected between the tip terminal 68 and the sleeve terminal 70, the tip being rounded at its end and preferably tapered so that coil spring conductor 60 tends to hold it in the inserted position. Coil spring conductor 56 engages the sleeve 70. Of course, the tension in the springs will hold the plug in place by pure friction so long as no tapers are present to exert a force tending to cam the plug out of place. Any portion of tip 68 projecting beyond panel 46 will be accommodated in the hole of rear cover panel 50. This insures correct alignment of the plug with respect to the conductor springs.

Call connection and matrix control

Figure 6:
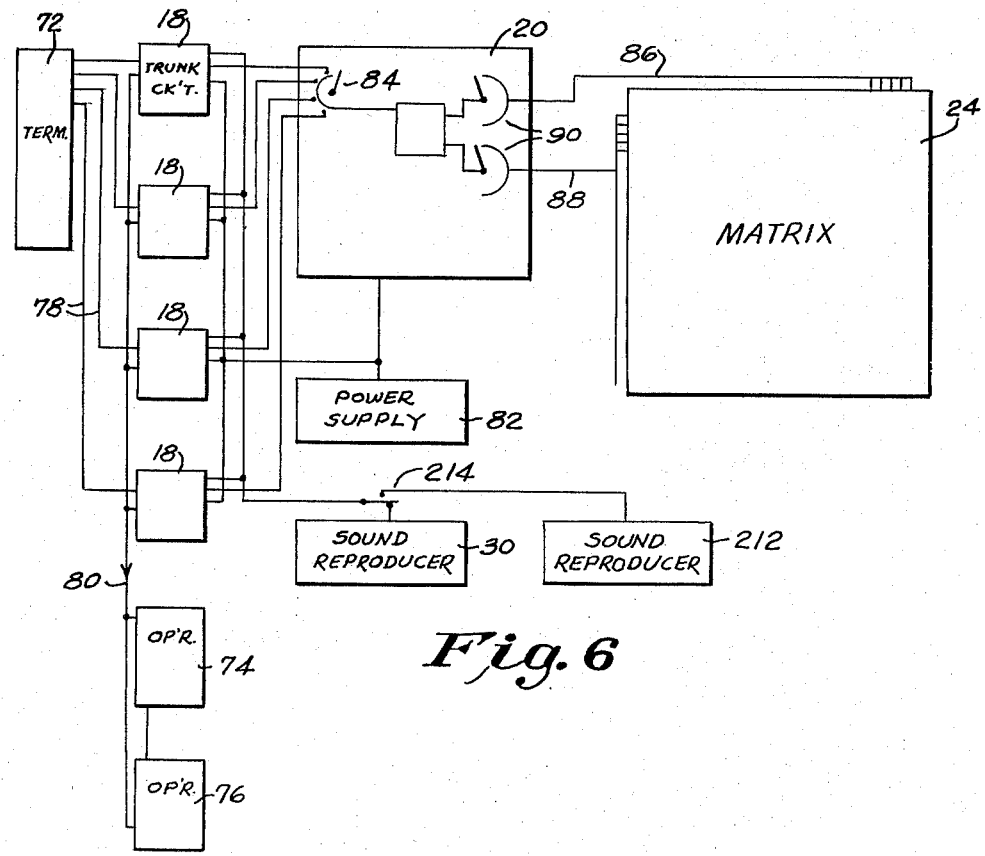
Fig. 6 is a schematic block diagram of the electrical interconnections between the incoming trunk terminal equipment, the matrix controlling switches and auxiliaries, and the matrix memory itself.

Fig. 6 of the drawings shows, in more detail than Fig. 1, the general path of control and the equipment involved. Like parts to those already mentioned are given the same reference numerals as in the preceding figures. Numeral 18 thus again designates the trunk circuits (four are provided in the example being described), numeral 20 designates the matrix control switches, and numeral 24 the matrix itself.

When a call to the credit department line or lines devoted to matrix interrogation is made, the normal exchange equipment extends the call as to a terminal indicated at 72, and where as here several trunk circuits are provided, this terminal may include conventional rotary or like switches for extending the call connection to a trunk circuit 18 which is not already busy. Four trunk circuits are shown in Fig. 6, and two operator's positions 74 and 76. The latter are exemplary of the manned telephones (such as 32 in Fig. 1) at which calls will be answered if the matrix storage indicates that such supervision is needed; e.g., if the account dialed is "bad." The incoming lines to the trunk circuits are designated by numeral 78, the operator answering lines by 80. A power supply for the trunk circuits and the matrix control is indicated schematically at 82, and a sound reproducer furnishing the "OK" or clearance code to the calling line is shown at 30 in agreement with Fig. 1. Leads from the power supply and sound reproducer to the equipment they supply are indicated by single lines. However, these lines are merely representative of the actual conductors, and it will be understood from the detailed circuit description below that in all cases these lines will consist of several conductors.

When a trunk circuit 18 has answered an incoming call, it will initiate operation of a line finder designated 84 in the matrix control 20, and the finder will connect the matrix control to that trunk circuit, unless of course the matrix control is at that instant involved in testing the matrix for a previous call over a different trunk circuit. The matrix control will be free before completion of the handling of any previous call, and hence can answer a second call from another trunk even though the previously used trunk is still involved in reporting the result of the matrix check, or in handling a connection to an operator.

When a newly seized trunk has obtained access to the matrix control 20, a dial tone is placed on the calling line, and the calling salesperson then dials the number of the account being questioned. The matrix control extends a testing circuit, in part indicated by the cabled conductors 86 and 88 and the selector switches 90, to the matrix board itself. If the account is clear, that is, if no marking plug connector is inserted at the corresponding cross point, the testing circuit encounters an open circuit, and the matrix control 20 operates to connect the output signal of sound reproducer 30 to the calling line. If a plug has been inserted at the interrogated cross point, the signal from reproducer 30 is not placed on the line, but the trunk circuit handling this call extends the same to one of the human operators manning the stations 74 and 76.

The above indicates briefly the functioning of the entire equipment; in the interest of clarity, certain auxiliary functions have been omitted, but these will be referred to in the detailed description which follows.

Details of trunk circuit and matrix control

Figure 7:
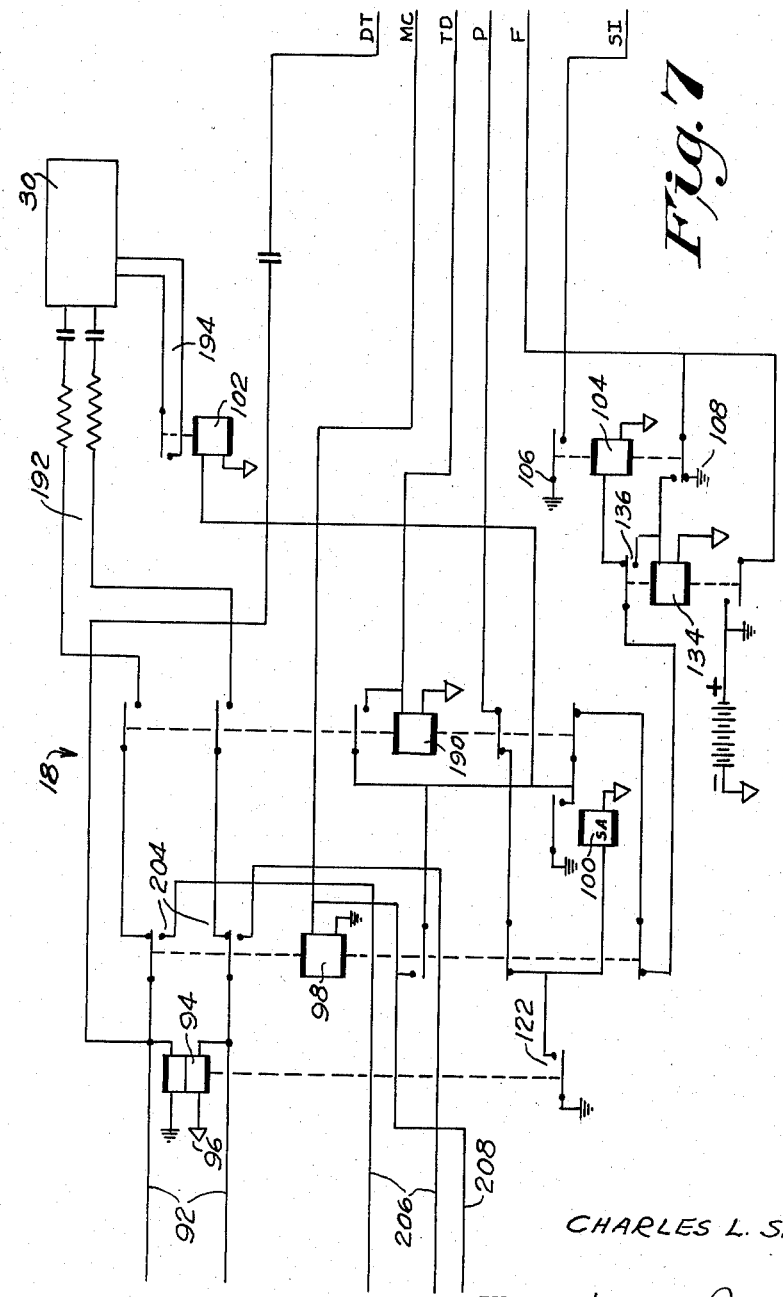
Fig. 7 is an electrical wiring diagram of the typical trunk circuit of the matrix control equipment and associated parts.

Figs. 7 and 8 show respectively a typical one of the trunk circuits 18, with auxiliaries necessary to the operation, and the circuit of the matrix control 20. These auxiliaries include, for example, a source of dial tone to indicate to the calling party that the account number can be dialed, the sound reproducer 30 with its output circuit and a starting control circuit, a power source for operation of the switches and relays, and a suitable signalling source for calls which are to be extended to the manned telephones in the credit department. In many installations, certain of these auxiliaries may be obtained from the services of the local telephone company, but they are indicated in what follows for completeness. Since the circuits connecting the trunk circuits 18 with the matrix control are intimately involved with one another, a composite description is given. Also, it may be stated that there are five conductors individual to each trunk circuit which extend to five levels of the rotary finder switch 84 of the matrix control, and one conductor common to all the trunk circuits which extends to the matrix control. This one conductor is designated "SI" (for start-in) and the five individual to each trunk circuit are designated respectively DT (for dial tone), MC (for matrix check), TD (for time delay), P (for pulse), and F (for finder). The terminals for these conductors are marked similarly in Figs. 7 and 8, so that a composite circuit diagram for the matrix control and one trunk circuit can be obtained by matching up the two figures with these terminals in alignment.

To avoid interrupting the description of the circuit operations, the nature of certain of the components will be briefly reviewed; these are well know in the art of telephone switching, and the description here is given for convenience. The essential component of the line finder 84 is a five-level rotary switch having at least as many bank terminals per level as there are trunk circuits in the installation. Such a switch is preferably arranged to return to its "home" or zero position by advancing its wipers forward, through self-interrupting contact springs, when it has completed its functions. A motor magnet is controlled appropriately by external pulses to advance the wipers during the circuit-selecting operation, and the same magnet operates it to home position when required. The selection of the desired horizontal and vertical matrix conductors from amongst the one hundred of each required for 10,000 cross-points, corresponding to any possible four-digit number, is by two 100-point two-motion switches of the Strowger type. One of these switches has its 100 bank contacts connected to the respective horizontal matrix conductors, the other to the 100 vertical matrix conductors. Each switch achieves its selection by lifting its wiper to any desired one of ten vertical levels, in response to one digit (expressed as a number of dial impulses) and then rotating the wiper to a selected one of ten possible horizontal (or rotary) positions in response to the next digit. Each switch has, besides the two motor magnets needed for these two motions, a release magnet whose operation restores the wiper to a lowermost position off the bank contacts in the known manner. Division of the four-digit series into two sets of two digits each (capable of driving the two-motion switches) is accomplished in a known way by a so-called minor switch, which is a switch having a rotating wiper driven stepwise by a motor magnet, and returned to its zero position by a spring released by a release magnet. The relays employed to control these switches are also of known form, employing copper slugs, sleeves and other known artifices for obtaining the desired operate and release time characteristics.

Operation of trunk circuit and matrix control

Referring now to Fig. 7 of the drawings, which shows the wiring of the typical trunk circuit designated as a whole by reference numeral 18, the incoming telephone line as from terminal 72 of Fig. 6 is marked 92. It is desired to operate relay 94 when the line is energized, and while this could be accomplished by the same battery which energizes the incoming line for telephone purposes, it is preferred to operate the relay 94 from the local power source indicated schematically at terminal 96. Thus, the line from the telephone line terminal may merely present a lowered impedance to operate relay 94. It will be observed that the line 92 is extended to certain contacts of the next relay 98. The operation of relay 94 closes the circuit to relay 100 which prepares a number of locking circuits, closes the operating circuit to relay 102 which initiates operation of the sound reproducer 30, and closes the operating circuit to relay 104, which operates. Contacts of relay 104 put positive battery (indicated by the ground symbol at 106) on the start-in lead SI extending to the matrix control diagram of Fig. 8, and also removes the positive battery connection at 108 from the finder lead F.

Positive battery on the start-in lead SI is forwarded through contacts 110 of relay 112 (Fig. 8) to the home position of level E on the finder banks 84, and to one terminal of the coil of relay 114. This positive battery on the home contact of the finder is forwarded through the level E wiper's contact number 1, contacts 116 of relay 114, through the interrupter springs 118 of the finder drive magnet 120, and starts the finder switch 84 rotating or searching automatically. The finder keeps operating step by step until it reaches the contact from which positive battery was removed in the trunk circuit (Fig. 7) by the operation of relay 104. This arrival at a position in which no positive battery connection to the wiper exists, prevents the finder switch from moving further and allows relay 114 to operate in series with the finder magnet 120 over a circuit back through contacts 110 and the SI lead to positive battery.

As the finder switch 84 rotated to locate the calling trunk, as just described, the wipers of levels A to E operated in unison. Thus the leads marked DT, MC, TD, P and F of the matrix control of Fig. 8 were each connected to the corresponding lead from the trunk circuit (Fig. 7) originating the call. In this way the matrix control circuits are put under the control of the particular incoming trunk on which the call was received.

Positive battery (ground symbol) on the P lead in Fig. 7 from contacts 122 of relay 94 is thus forwarded to relay 124 of the matrix control (Fig. 8) so that relay 124 operates and completes a circuit to the coil of relay 112 at contacts 126. Relay 112 provides a locking circuit for relay 94, and an operating circuit at contacts 128 for relay 130. It also connects positive battery back to the finder lead F, over contacts 132, to prevent any other finder (in the case of an installation utilizing plural matrices) from making connection to the same trunk circuit. This positive battery on the F lead also causes operation of relay 134 of the trunk circuit to close its own locking circuit at contacts 136 and to release relay 104. Release (de-energization) of relay 104 removes the positive battery at 106 from the SI lead so that the matrix control equipment will not be signalled again by this particular trunk circuit of Fig. 7 until the trunk circuit has been released and put into use again on a subsequent call.

During the operate (pull-in) time of relay 100, which is relatively slow-to-operate, a momentary circuit is closed to the minor switch motor magnet 138 over contacts 126 of relay 124 and contacts 140 of relay 112. This circuit will be opened when relay 112 operates. An audible dial tone from the dial tone buzzer relay 142 is placed back on the DT lead to the trunk circuit (Fig. 7) whose call has just been answered. This signal tells the calling party that he has reached the matrix check apparatus and should now dial the digits of the account number being checked.

Dial pulses which originally release and re-operate relay 94 of the trunk circuit are passed on or repeated at contacts 122 of relay 94 to the lead P and operate relay 124 in Fig. 8. Each time relay 124 falls back and re-operates as a result of dialing, contact is closed through contacts 126 of relay 124, contacts 144 of relay 112 into the lower level of minor switch banks at 146. During the first digit the minor switch magnet 138 has received only one pulse (112 being a slow acting relay) and thus the dial pulses are forwarded over contact 148 of the bank level 146 to magnet 150 which is the vertical drive magnet of the two-motion switch 152 whose terminal banks are connected to the vertical matrix conductors, as over the cable 86 of Fig. 6.

Relays 154 and 156 operate in tandem from the same series of dial pulses, with 154 remaining operated until the end of the first digit because of its slow-release characteristic. At the end of the first digit, relay 154 releases and a short time later 156 releases. However, during the release time of 156 a momentary circuit is closed again to the minor switch stepping magnet 138 over contacts 158 causing the minor switch to step to its second position. Thus the next (second) series of dial pulses representing the second digit of the account number are channeled into the horizontal drive magnet 160 of the two-motion switch 152. The wiper of the two-motion switch is thus brought into contact with a selected vertical conductor of the matrix.

In a like manner, description of which in detail is unnecessary, the dial pulses of the third and fourth digits are channeled into the vertical magnet 162 and horizontal magnet 164 of the second two-motion switch 166 to operate this two-motion switch to choose the horizontal matrix conductor. At the end of the fourth digit pulses, the minor switch will be stepped to its fifth contact point and positive battery from contacts 168 of relay 154 will be forwarded through the middle level 170 of the minor switch and conductor 172 to relay 174, which is slow to operate. This connects positive battery from its contacts 176 to the lead 178 and level C of the finder banks and thence back over the TD lead to the trunk circuit. It also closes the circuit to slow-to-operate relay 180 at contacts 182, which will operate a short time later.

During the operated delay of relay 174 a closed circuit through the matrix cross point which has been selected by the dial pulses, will cause operation of relay 184, since positive battery (ground) is placed out over the vertical matrix conductors, through the middle minor switch bank 170 and back through the horizontal matrix conductor to one side of relay 184. The other side of the coil of relay 184 is connected into a voltage divider 186, 188 which provides the necessary negative potential to operate relay 188 if the matrix point is closed. Thus if the matrix cross point is closed (diode plug inserted), relay 184 will operate before relay 174. If the matrix cross point is open (no plug inserted), relay 184 does not operate, and control is exercised by relay 174. Thus, the paths just described constitute a testing circuit for determining whether a particular crosspoint, namely that defined by the dial pulses giving the account number, is marked by the presence of a plug connector. The condition of this testing circuit controls whether the prerecorded clearance signal from reproducer 30 is applied to the calling line, or said line is instead extended to a human operator or credit department answering clerk.

Consider first the case in which there is no diode plug connector inserted at the selected matrix cross point. Relay 184 does not operate and 174 operates after a short time, closing the positive battery to the TD lead over contacts 176 and conductor 178, through level C contact of the finder 84 and operates relay 190 of the trunk circuit in Fig. 7. This relay connects the calling line 92 to the output of reproducer 30 over contacts of relay 190 and the conductors 192, the reproducer having already been started (energized) by operation of relay 102 to connect the start control conductors 194. While the clearance or "OK" signal is being sent back to the calling party, relay 180 operates after a short delay and opens circuit to relay 124, release of which also releases relay 112, and closes a circuit to the release magnets of the minor switch and the two-motion switches, these release magnets being designated 196, 198 and 200, restoring them in preparation for another call. Relay 112 releasing also opens the circuits to relays 114 and 130, which drop back, and the finder switch 84 either returns to home position (moving of course in the forward direction by self-interruption) or it may answer another call if one is awaiting on a trunk connected farther around the bank of finder switch contacts.

Now consider the condition in which relay 184 has been operated from the matrix cross point test circuit before relay 174 had time to operate; i.e., when a diode plug connector is present at the selected cross point. Relay 184 closes positive battery (ground) from the contacts 202 to the matrix check lead MC through level B of finder 84, back over lead MC to the trunk circuit (Fig. 7) and operates relay 98 therein. This immediately cuts off the calling line from any possible connection to reproducer 30 (at contacts 204) and connects it instead to the leads 206 which go to the credit department P.B.X or, in the particular case being described, to the operator's stations 74, 76 in Fig. 6. Also, positive battery is placed on the lead 208 to light a lamp or give other signal to the operator that a call is waiting to be answered. In the matrix control center of Fig. 8, relay 180 has operated and has released the matrix control switches as before to free it for a subsequent call. Relays 94, 98 and 100 of the trunk circuit (Fig. 7) are held until the called party releases them for use in another call.

The above description has assumed that a single matrix board of the kind indicated is employed. Where, as indicated in Fig. 2, there are several matrices, connections to the proper one are also obtained by machine switching such as described, additional digits being dialed to control the additional switching centers required. Thus, in Fig. 8, the start-in lead SI is shown as extended at numeral 210 to pass the control to a subsequent switching center. Actually, of course, the equipment in Fig. 8 may itself represent an intermediate switching stage, in which the SI lead will be energized from a preceding stage rather than directly from a trunk circuit.

In order to facilitate the changing of the clearance code from time to time, and thereby to ensure that the salespeople actually perform the credit check, and to do this without interrupting the checking service, an alternate reproducer 212 is indicated in Fig. 6. A new code may be set up on the reproducer which is temporarily idle, and this reproducer then put into service by operating the manual switch 214.

For convenience and accuracy in checking the condition of any jack position, as to whether it is marked by a plug or not, and for locating any desired cross point, the matrix panel holes 40 may be marked in numerical order. However, as indicated in Fig. 3, traversable numericlly gradulated locator bars such as indicated at 214 and 216 may be roller mounted on the matrix frame, and in this case only the cross-point spacings along an edge of each bar need be marked. In general, when a change in the board is made, the person making the change will make a test call, using for example telephone 14 of Figs. 1 and 2, to verify that the desired condition of the changed cross point or points has been achieved.

In a matrix board of this type, in which many vertical conductors of the matrix may be connected through a plurality of plugs to different horizontal conductors, shunt paths will exist between any given vertical conductor and any given horizontal conductor. If the plugs were mere shunts, it would obviously be possible for the circuit through the matrix-testing circuit to be completed over numerous paths not unique to a particular combination of one selected vertical conductor and one selected horizontal conductor, and a false indication would be given. The use of unidirectional elements in the plugs, all poled the same way with respect to the tip and sleeve terminals, provides that any alternative path through the mesh, from a selected vertical to a selected horizontal, will include at least one such unidirectional element poled in the reverse (low or non-conducting) direction. Only the direct path between the selected horizontal and vertical conductors will include no diode or rectifier poled against the current-conducting direction.

Since the appreciable difference between conductivities of (a) the direct path with a single diode and (b) the shunt combination of all possible indirect paths each including at least one diode poled against conduction, is what has to be sensed by the testing circuit, it will be seen that the tolerance on reverse current conduction of the diode elements is determined by how many shunt paths can exist, and this is a function of the number of elements in the matrix. This furnishes another important reason for breaking a large installation up into plural matrices and selection stages, rather than attempting to build a matrix of sufficient size to permit direct selection amongst all the accounts. The ratio of forward-to-back conduction of the typical diode plug will not be infinite for practical diodes, and the use of multiple matrices thus permits utilization of plugs of relatively lower cost and ample availability.

While the invention has been described herein in connection with a preferred embodiment and certain variants thereof, it is to be understood that the details given are intended by way of illustration, and that various changes and elaborations of the novel system can be made by those skilled in the art without departing from the spirit and scope of the invention as defined in the appended claims.

What is claimed is:

1. A matrix memory storage type condition checking system for interrogation and response over lines of an automatic telephone exchange, comprising a matrix of isolated conductors arranged to form columns and rows of crossing points including means at each crossing point for electrically connecting any desired column conductors with any desired row conductors through removable plug connectors each forming a unidirectionally conducting shunt between said conductors, switches connected for control by selecting pulses on a calling telephone line for connecting a testing circuit between a selected column conductor and a selected row conductor, signalling means controlled by said testing circuit for repeating over said calling line a checking signal in the event that the selected column and row conductors are not connected by a plug connector, and means controlled by said testing circuit for extending the calling line to a supervisory telephone station if the selected column and row conductors are connected by a plug connector.

2. A checking system in accordance with claim 1, in which said plug connectors each comprise a diode element for establishing a substantially unidirectional current path between the desired column and row conductors.

3. A checking system in accordance with claim 1, in which the conductors of said matrix are formed as continuous spiral-wound springs supported in tension to provide spring contacts for plug connectors bridged across any of the crossing points of said matrix.

4. A checking system in accordance with claim 1, including at least one auxiliary signalling means and manually operable means for selecting either such signalling means alternately for connection to the calling line under the control of said testing circuit.

5. A checking system in accordance with claim 1, in which the last-named means is controlled by said testing circuit for extending the calling line to any of several supervisory telephone stations in accordance with selecting pulses on the calling telephone line.

6. A checking system in accordance with claim 1, in which there are provided a plurality of such matrices, and including selecting mechanism for connecting the testing circuit to desired conductors of a selected one of said matrices in response to certain combinations of selecting pulses on the calling line.

References Cited in the file of this patent

UNITED STATES PATENTS

| | | |
|---|---|---|
| 2,298,487 | Kiner | Oct. 13, 1942 |
| 2,397,881 | Nitterauer | Apr. 2, 1946 |
| 2,579,141 | Eckert et al. | Dec. 18, 1951 |
| 2,754,453 | Noell | July 10, 1957 |